C. HEILRATH.
ADJUSTABLE LIGHT SHADE FOR VEHICLE LAMPS.
APPLICATION FILED SEPT. 30, 1915.
1,191,422.
Patented July 18, 1916.
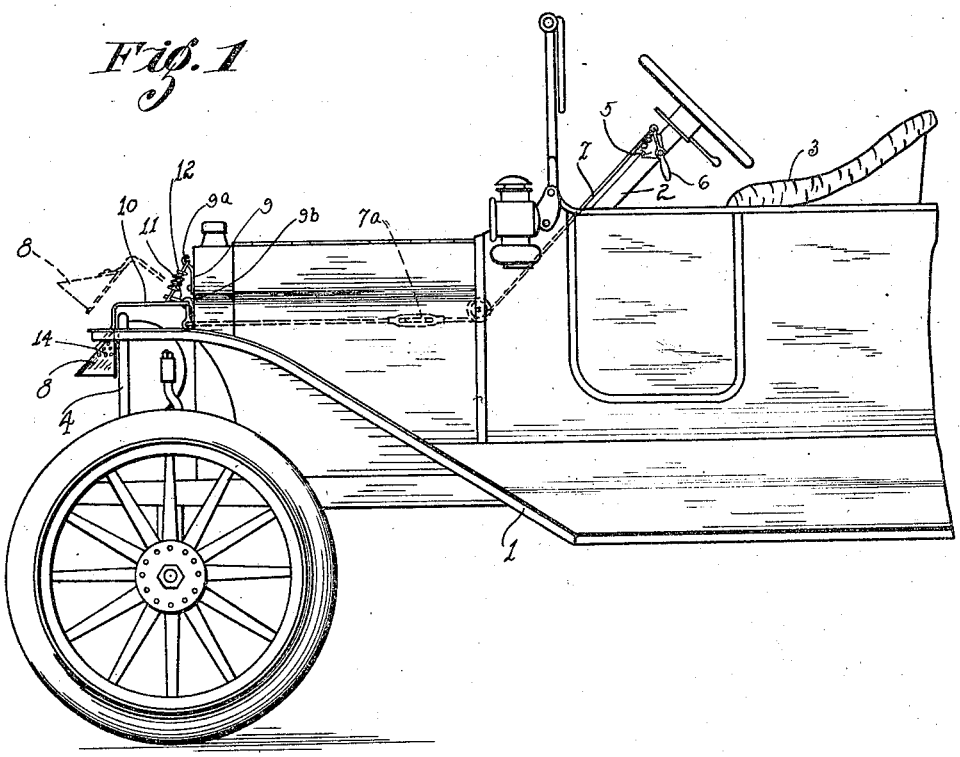
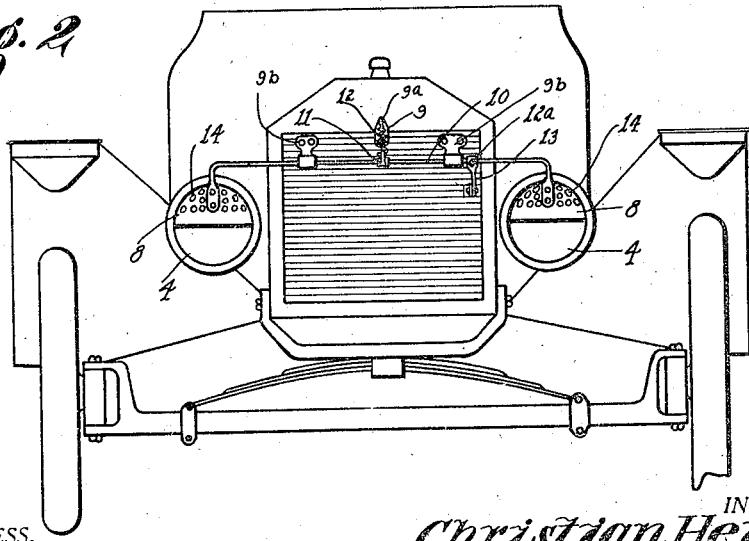
WITNESS.
Floyd M. Blanchard
INVENTOR.
Christian Heilrath
BY
Attorney.

UNITED STATES PATENT OFFICE.

CHRISTIAN HEILRATH, OF SACRAMENTO, CALIFORNIA.

ADJUSTABLE LIGHT-SHADE FOR VEHICLE-LAMPS.

1,191,422.  Specification of Letters Patent.  Patented July 18, 1916.

Application filed September 30, 1915. Serial No. 53,243.

*To all whom it may concern:*

Be it known that I, CHRISTIAN HEILRATH, a citizen of the United States, residing at Sacramento, in the county of Sacramento, State of California, have invented certain new and useful Improvements in Adjustable Light-Shades for Vehicle-Lamps; and I do declare the following to be a clear, full, and exact description of the same, reference being had to the accompanying drawings, and to the characters of reference marked thereon, which form a part of this application.

This invention relates to appliances for use in connection with the headlights of motor vehicles or other similar vehicles, the object of the invention being to produce an adjustable shade for such lamps, operated from or near the seat of the driver of the vehicle, whereby the light may be partly shut off at the will of the operator so as to not blind the occupants of another approaching vehicle. A great many laws are now being enacted requiring that lights be shaded when one vehicle is passing another or when within the limits of cities, and to this end it becomes necessary to have some form of shade by which this can be done. It is desirable however, that when not passing other vehicles or when not within the limits of cities, that the full benefit of the light may be had and it is the aim of my invention to so provide a shade that, as above indicated, it may be thrown over the light at certain times and at other times be completely removed therefrom.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a side elevation of a motor vehicle showing my complete device installed thereon. Fig. 2 is a front elevation of a portion of the vehicle showing the lamps and the shades in position over the same.

Referring now more particularly to the characters of reference on the drawings, the numeral 1 designates the motor vehicle having the usual steering post 2, operator seat 3 and headlights 4.

My improved device is operable from the seat 3 and may be either placed on the steering post of the vehicle or on the floor or other convenient place for operation by the driver of the vehicle either with his hands or feet. As one illustration of this, I have shown it secured to the steering post 2 in the form of a notched quadrant 5 having a small lever 6 operable thereover, whereby the same may be fixed at different desired positions according to the amount of light which it is desired to shade at any given time. A flexible cable or other suitable connecting member 7 leads from the member 6 to the structure for operating the lamp shades, such shades being indicated by the numeral 8. The member 7 is provided with a turn buckle 7ª in its length whereby it may be adjusted for correct operation.

The shade supporting mechanism comprises primarily brackets 9ᵇ suitably fastened to the forward end of the car either to the radiator, cross bar from the lamps, or at any other place found desirable, according to the make of the car.

Turnably mounted in the lower end of the brackets 9ᵇ is a cross rod 10 having a projecting finger member 11. A pull spring 12 is connected with the finger 11 and at its upper end with a hook 9ª, arranged at a convenient point. Adjustably secured to the rod 10 by means of a set screw 12ª, or other desired form of securing means, is a downwardly projecting member 13 flexibly connected with the member 7. The outer ends of the rod 10 are suitably bent and secured to the shades 8 in any desired manner.

In practice, the normal position of the parts is such that the member 7 is loose and the action of the spring 12 pulls against the finger member 11 to turn the rod 10 so that the shades 8 are held away from the lamp 4, as shown by dotted lines in Fig. 1. When the shades are to be used, the member 6, or other such mechanism, is operated by the driver of the car from his seat to pull on the member 7. This pulls on the finger member 13 and turns the rod 10 in the opposite direction to pull the shades 8 over the lamps to cut off the light to the desired degree. Different degrees of shade can be had by setting the member 6 at different points on the quadrant 5.

The adjustment of the finger member 13 is to allow the device to be fitted to different makes of cars and the rod 10, if desired, can be made telescopic for a similar reason.

The greatest benefit to be derived from the use of my improved structure is that the same can be operated from the driver's seat for the purpose of shading the lights at desired times and at other times leaving them unshaded so that the full effect and benefit of the lights can be had when driving at night.

In practice, the rear edge of the shade may be spaced a slight distance from the face of the lamp to allow of ease in movement and by reason of this there will at all times be an arc of light flaring out from above the shade which will have the benefit of showing the exact position of the lights to another approaching vehicle, but without any blinding glare. If, perchance, the shade should completely cover the upper portion of the lamp, I could provide it with a plurality of perforations 14. The rays of light admitted through these perforations would give added warning to approaching vehicles without causing a blinding glare.

From the foregoing description, it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention, what I claim as new and useful and desire to secure by Letters Patent is:—

A device of the character described comprising the combination with a motor vehicle, of brackets disposed adjacent the lamps, a rod turnable in said brackets, shades secured to the ends of said rod, a projecting finger member on said rod, a spring arranged to pull on said finger member, another finger member on the rod, a cable connected with said last named finger member and projecting to a point adjacent the driver's seat of the vehicle, and a lever means connected with said cable, as described.

CHRISTIAN HEILRATH.

Witnesses:
MABEL G. BOARD,
FLOYD M. BLANCHARD.